Dec. 9, 1930.   O. T. NICHOL   1,784,534
TRACTOR PILOT STRUCTURE
Filed Nov. 19, 1929   2 Sheets-Sheet 1
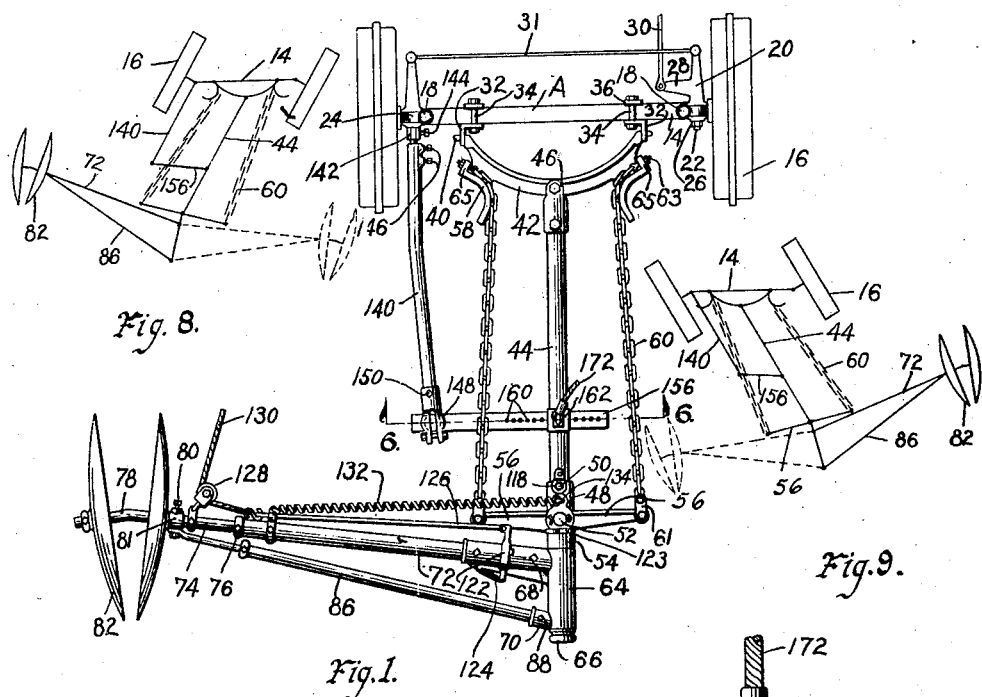
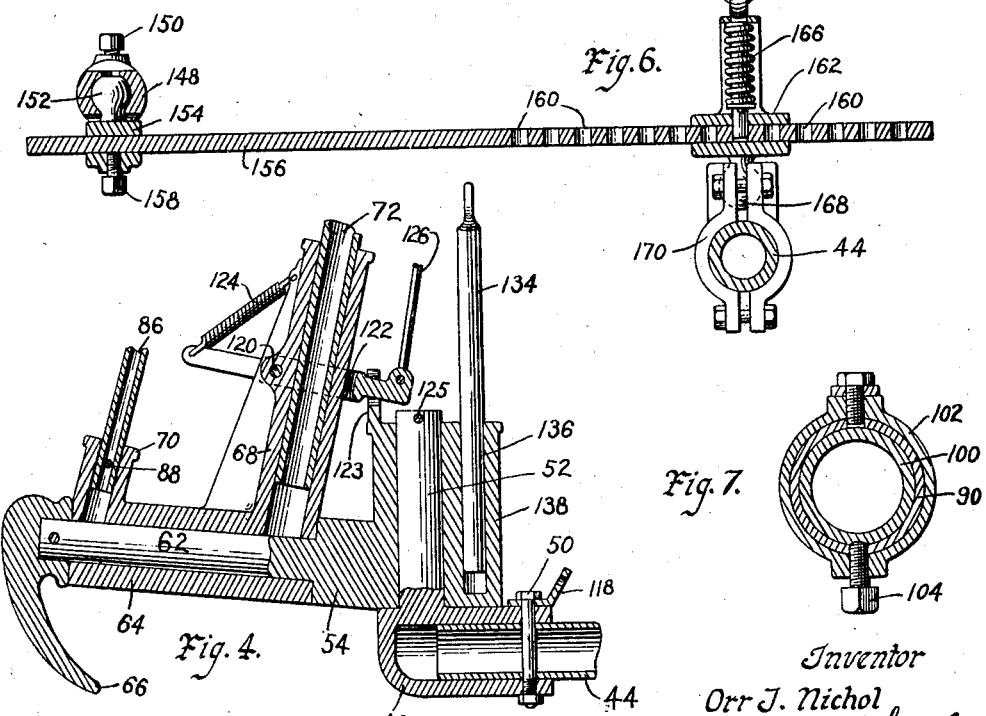
Inventor
Orr T. Nichol
by Bair, Freeman & Sinclair
Attorneys
Witness
Ralph Collins

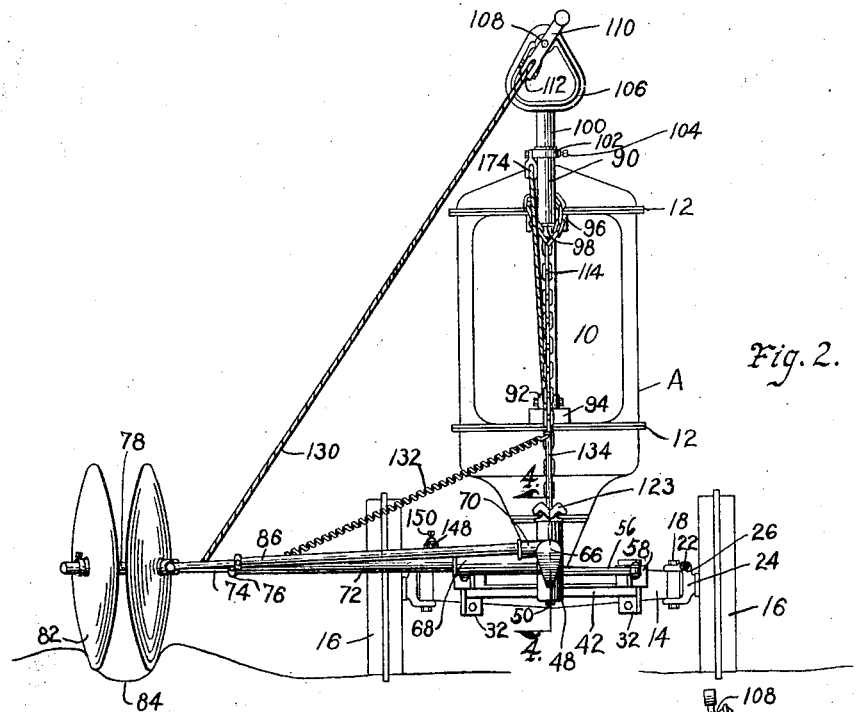
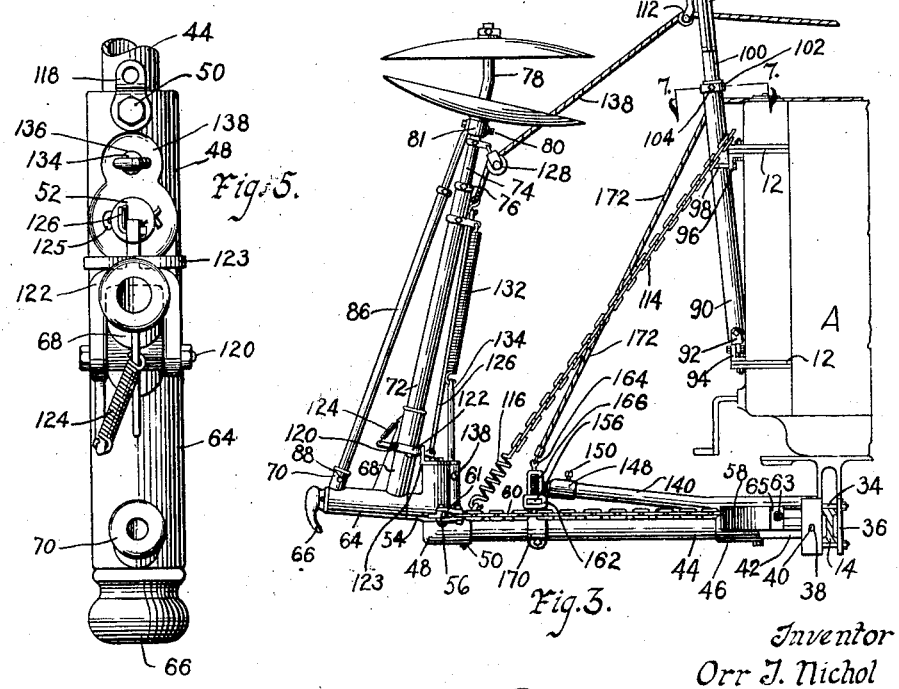

Patented Dec. 9, 1930

1,784,534

UNITED STATES PATENT OFFICE

ORR T. NICHOL, OF OMAHA, NEBRASKA, ASSIGNOR TO NICHOL MANUFACTURING COMPANY, OF OMAHA, NEBRASKA, A CORPORATION OF NEBRASKA

TRACTOR PILOT STRUCTURE

Application filed November 19, 1929. Serial No. 408,269.

The object of my invention is to provide a tractor pilot structure which is simple, durable and comparatively inexpensive to manufacture.

More particularly it is my object to provide a tractor pilot structure for use with the ordinary type of tractor having steerable front wheels, the pilot being adaptable for use in fields having furrows or ridges which may be engaged by a pilot wheel for actuating the steering mechanism of the tractor and thereby steering it. Such furrows or ridges could be formed by plows, cultivators, listers or other agricultural implements pulled behind the tractor.

Another object of my present invention is to provide a pilot device having a pilot head with means for maintaining it in substantially the same angular relation with respect to the tractor throughout the entire swinging movement of a pilot tongue included in the structure, such means being arranged to change such angular relation slightly when the head is moved from a straight forward position, the degree of angular relation increasing with an increase in the turning movement of the steering mechanism.

Another object is to provide a pilot structure having a pilot arm of extensible construction with a rope for raising the arm to an inoperative position and for reversing the pilot arm relative to the pilot head, an upright being provided on the front end of the tractor for supporting a pulley over which the rope extends, the upright itself also being of extensible construction whereby when the pilot arm is extended, the upright may also be extended for more effectively raising and lowering the pilot arm with the rope.

Still a further object is to provide a latch mechanism for maintaining the pilot arm in upright or inoperative position, the latch thereof being operatively connected with the rope and operable therefrom to unlatched position.

Still a further object is to provide an adjustment structure between the pilot tongue and the steering mechanism of the tractor whereby the wheels of the tractor may be adjusted by the steering wheel thereof to any desired position with respect to the pilot tongue all of which is controllable by the driver of the tractor from his seat.

Still a further object is to provide means for keeping the pilot head at the front of the pilot arm in substantially the same parallel position with respect to the fore and aft axis of the tractor, by changing its angular relation slightly with respect thereto when moved from a straight forward position, such means consisting of a pair of chains pivotally connected with laterally extending arms on the pilot head and with cam members adjacent the tractor.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a plan view of the front axle of a tractor showing my improved tractor pilot structure attached thereto.

Figure 2 is a front elevation of the same showing the front of the tractor.

Figure 3 is a side elevation of the pilot structure on the front of the tractor showing the structure in inoperative position.

Figure 4 is an enlarged sectional view on the line 4—4 of Figure 2.

Figure 5 is a plan view of parts at the forward end of the pilot structure, showing the pilot head and its connection with the pilot arm in upright or inoperative position.

Figure 6 is a detailed sectional view on the line 6—6 of Figure 1.

Figure 7 is an enlarged sectional view on the line 7—7 of Figure 3 showing the adjustment for the telescoping upright.

Figure 8 is a diagrammatic view showing the tractor steered to the right and

Figure 9 is a similar view showing the tractor steered to the left.

On the accompanying drawings, I have used the reference numeral 10 to indicate the radiator of a tractor A. The radiator 10 is provided with flanges 12 whereby the various sections thereof are bolted together.

The front axle of the tractor A is indicated at 14 and the steerable front wheels of the tractor at 16. The wheels 16 have their spindles 24 pivoted at 18 for steering movement. Steering arms 20 are provided with threaded portions 22 which extend through the spindle members 24 and by means of nuts 26 the arms 20 are normally fastened relative to the spindles 24. A steering arm 28 is connected by a drag link 30 to the steering mechanism of the tractor A (the steering mechanism is not shown on the drawings). The two arms 20 are interconnected by a link 31. The foregoing description refers to a tractor of the "automobile steering" type.

My improved type of tractor pilot structure includes a pair of angle brackets 32 adapted to be secured to the front axle 14 by means of clamping bolts 34 and bars 36. The angle brackets 32 are provided with openings 38 into which trunnions 40 of a yoke like supporting member 42 extend. In attaching the parts just described to the axle 14, the brackets 32 may first of all be spaced far enough apart to allow entrance of the trunnions 40 into the openings 38 whereupon the brackets are shifted toward each other. The bolts 34 may then be tightened.

A pilot tongue 44 is pivoted on a vertical axis at 46 to the member 42. The outer end of the tongue 44 extends into a tongue head 48 and may be secured therein by a bolt 50 or the like. The tongue head 48 is provided with an upstanding stub shaft 52. A pilot head 54 is rotatably mounted on the stub shaft 52 and is provided with a pair of arms 56.

The yoke member 42 has a pair of curved cams 58 and chains 60 serve to connect the outer ends of the arms 56 with the yoke member 42 in the following described manner:

The chains 60 are connected by clevises 61 at their forward ends to the laterally extending arms 56 of the pilot head 54. The rear ends of the chains 60 are connected with adjusting bolts 63 extending through perforated ears 65, formed on the cams 58, whereby all slack may be taken from the chains 60. The pivotal connection 52 is in alignment with the pivotal connection of the arms 56 with the clevises 61. The chains 60 are almost parallel with the tongue 44.

The purpose of this construction is to maintain a forwardly projecting stub shaft 62 of the pilot head 54 in almost parallel relation at all times with the fore and aft axis of the tractor A throughout the entire swinging movement of the pilot tongue 44 with a slight variation from a parallel relation as shown in Figures 8 and 9. This is so that the guide discs 82 will swing backwardly when turning in a direction toward the discs and forwardly when turning in an opposite direction, as shown by the dotted lines in these figures. I have found that this construction imparts the desired steering movement to the tongue 44 which cannot be attained by keeping the guide head always parallel with the fore and aft axis of the tractor. Incidentally the change from such a parallel position is exaggerated in the diagrammatic Figures 8 and 9.

A hub fitting 64 is rotatably mounted on the stub shaft 62 of the pilot head 54. The fitting 64 is retained thereon by a guard 66. The fitting 64 is provided with a pair of laterally extending bosses 68 and 70. A pilot arm 72 of tubular construction is mounted in the boss 68. A pilot arm extension 74 is telescopically mounted in the pilot arm 72. By means of a collar and set screw 76 arranged in a manner similar to that shown in Figure 7, the extension 74 is held in any adjusted position relative to the pilot arm 72.

A pilot wheel shaft 78 extends into the extension 74 (which is also of tubular construction) and is held therein by a set screw 80 extending thru a set collar 81. The pilot wheel shaft 78 is best shown in Figures 1 and 2 and is provided with a pilot wheel consisting of a pair of discs 82. These may be set at the angle shown in the drawings to coact with a furrow 84 whereby the tractor is piloted. The shaft 78 may be rotated for causing different inclinations of the discs 82 depending on the character of the furrow with which the pilot wheel coacts.

A brace rod 86 of extensible construction and in that respect similar to the extensible pilot arm 72 has one end secured in the boss 70 by a cotter key 88 and its other end secured to the collar 81 in which the set screw 80 is mounted.

The guard 66 is of such construction and curvature that upon engaging an obstruction it will cause the front end of the pilot structure to be raised for passing over such obstruction, by causing it to spring upwardly with the trunnions 40 acting as a horizontal pivot.

On the tractor A, I provide an upright 90 of tubular construction. A forked fitting 92 is secured to the lower end thereof. The fitting 92 has a downwardly extending ear secured to an angle bracket 94 which in turn is bolted to the lower flange 12 of the radiator 10. An angle bracket 96 is secured to the upper flange 12 and the upright 90 is connected therewith by a U bolt 98. An extension 100 is telescopically mounted in the upright 90 and may be held in any adjusted position relative thereto by a set collar 102 and set screw 104.

A looped fitting 106 is secured to the upper end of the extension 100 and is provided with a boss 108. A pulley arm 110 is pivoted to the boss 108. A pulley 112 is journaled in the lower end of the pulley arm 110, such end being forked to receive the pulley.

For supporting the outer free end of the pilot tongue 44, I provide a chain 114 and a spring 116. The upper end of the chain 114 extends around the upright 90 above the upper flange 12 of the radiator 10. The lower end of the spring 116 hooks in an eye bracket 118 bolted to the tongue head 48 by the bolt 50.

Pivoted on a pin 120 mounted on the hub 68 of the fitting 64, I provide a forked latch member 122 best shown in Figures 4 and 5 of the drawings. The latch 122 is constrained toward pivotal movement on the pin 120 in one direction by a spring 124 having one end connected with one end of the latch and its other end connected with the hub 68. A rod 126 is connected with the other end of the latch 122 and extends toward a pulley 128 mounted on the outer end of the pilot arm. The outer end of the rod 126 is connected with a rope 130 which extends around the pulley 128 and over the pulley 112. From the pulley 112 the rope 130 extends to the driver of the tractor A.

To counterbalance and partially support the pilot arm, I provide a spring 132 having one end connected with the pilot arm and its other end connected with the upper end of a vertical rod 134. The rod 134 is mounted in a socket 136 in the pilot head 54 and is vertically slidable therein. A set screw 138 is utilized for holding the rod 134 in any vertically adjusted position whereby the tension of the spring 132 may be adjusted and yet the pilot arm may be swung to either the right or the left side of the tractor A.

For steering the tractor wheels 16 from the pilot tongue 44, I provide a tubular lever 140 having one end fitted over a nut 142 provided with a rod like extension. The nut 142 is designed to replace one of the nuts 26 and may be retained in tightened position on the stud 22 of the arm 20 by a set screw 144. Set screws 146 allow for sliding and rotating adjustment of the lever 140 relative to the rod like extension on the nut 142.

A socket fitting 148 is mounted on the forward end of the lever 140 and retained thereon by a set screw 150. It will be noted that the lever 140 has a bend in it whereby the forward end may be adjusted up or down or to either side as the dimensions of the particular tractor, to which the structure is applied, may require. The socket fitting 150 coacts with a ball 152 formed on a fitting 154. The fitting 154 is adapted to be secured to a pilot bar 156 by means of a set screw 158. The pilot bar 156 is provided with a plurality of spaced openings 160 and is slidably mounted in a fitting 162. The fitting 162 carries a slidable pin 164 which is held in one of the openings 160 by a spring 166.

The fitting 162 has a ball 168 adapted to fit within a socket fitting 170. The fitting 170 is adapted to be clamped to the pilot tongue 44 as best shown in Figure 6 of the drawings.

A rope 172 is connected with the pin 164 and extends over a pulley 174 and back to the driver of the tractor A.

*Practical operation*

In the operation of my device the pilot discs 82 are adapted to travel in the furrow 84 previously formed by an agricultural implement pulled behind the tractor A. When there is any variation in the furrow 84, as for instance to the right, the parts of the device and of the tractor will assume the position shown in Figure 8 to a greater or less degree. This causes the tractor to be steered in such a way as to follow a course parallel with the furrow 84. At the end of a furrow, the rope 130 may be pulled to raise the pilot structure to the position shown in Figure 3, whereupon the rope 130 may be released. This will allow the rear end of the latch 122 to drop in the central notch of a latch reception member 123. The member 123 is formed on the pilot head 54 and a pin 125 holds the pilot head against removal from the stub shaft 52.

After the tractor has been turned around the rope 130 may be pulled for releasing the latch 122 from the latch reception member 123 and the pilot arm may then be let down to operative position. If it starts to swing in the wrong direction the rope may be first pulled and then released for swinging the pilot arm in the opposite and desired direction.

The pilot discs are shown adjusted for two row operation. Where the agricultural implement makes three furrows at one time the discs may be moved to an extended position. The extension 100 of the upright 90 is then also extended so that the rope 130 can be properly manipulated for raising the pilot arm. It will be noted that the stub shaft 62 of the pilot head 54 is tipped upwardly, this allows the discs 82 to assume a close position to the tractor A when in upright position and also makes it easier to raise the pilot arm by the rope 130.

When the tractor is operated on the side of a hill and there is a tendency for it to drift downwardly, this can be counteracted from the driver's seat by pulling the rope 172, steering the front wheels 16 toward the up hill side to a desired angle and then releasing the rope 172, whereupon the pin 164 will coact with a different opening 160.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a tractor pilot structure, a supporting member adapted to be attached to the front axle of a tractor, a pilot tongue pivoted thereto and extending forwardly therefrom, a pilot head pivoted to the forward end of said pilot tongue, a pilot arm extending transversely from said pilot head, a pilot wheel on the outer end of said pilot arm, a steering connection between the front wheels on said front axle and said pilot tongue and means for maintaining said pilot head at substantially the same angle relative to the tractor throughout the entire swinging movement of said pilot tongue, said means comprising arms on said supporting member and on said pilot head and flexible members having their ends connected to said arms.

2. In a tractor pilot structure, a supporting member adapted to be attached to the front axle of a tractor, a pilot tongue pivoted thereto and extending forwardly therefrom, a pilot head pivoted to the forward end of said pilot tongue, a pilot arm extending transversely from said pilot head, a pilot wheel on the outer end of said pilot arm, a steering connection between the front wheels on said front axle and said pilot tongue, an upright on said tractor, a pulley supported on the upper end thereof, a rope extending over said pulley and connected with said pilot arm, said upright and pilot arm each being extensible.

3. In a tractor pilot structure, a supporting member adapted to be attached to the front axle of a tractor, a pilot tongue pivoted thereto and extending forwardly therefrom, a pilot head pivoted to the forward end of said plot tongue, a pilot arm extending transversely from said pilot head, a pilot wheel on the outer end of said pilot arm, a steering connection between the front wheels on said front axle and said pilot tongue, an upright on said tractor, a pulley supported on the upper end thereof, a pulley on the outer end of said pilot arm, a spring latch on the inner end thereof, a rope extending over both of said pulleys and connected with said latch and a latch reception member carried by said pilot head.

4. In a tractor pilot structure, a pilot tongue, a pilot arm pivoted thereto, a pulley supported by the tractor, a pulley and a latch on the pilot arm, a rope extending over both of said pulleys and connected with said latch and a latch reception member carried by said pilot tongue.

5. In a tractor pilot structure, a pilot tongue, a pilot arm pivoted thereto, a steering connection between the front wheels on said front axle and said pilot tongue, said steering connection including a block member, a pilot bar having a plurality of spaced openings slidable therethrough, a spring actuated pin carried by said member and selectively engageable with said openings and means extending from said pin to a position on the tractor for withdrawing the pin when said means is moved by the driver.

6. In a tractor pilot structure, a pilot tongue, a pilot arm pivoted thereto, a spring for partially supporting said pilot arm when in a horizontal position, a vertical rod slidably mounted with respect to said pilot tongue, one end of said spring being connected with the upper end of said rod and means for locking said rod in any desired position with respect to said pilot tongue.

7. In a tractor pilot structure, a pilot tongue, a pilot arm pivoted thereto, a steering connection between the front wheels on said front axle and said pilot tongue, said steering connection including a pilot bar connected with said pilot tongue, a pilot lever having one end rigidly connected with a movable portion of the steering mechanism of the tractor and a ball and socket connection between the other end thereof and said pilot bar.

8. In a tractor pilot structure, a pilot tongue, a pilot arm pivoted thereto, a steering connection between the front wheels on said front axle and said pilot tongue, said connection including a spring pin and means extending to a position on the tractor for retracting said pin, a pilot bar slidable through said connection, said bar having a plurality of spaced openings with which said pin may selectively coact, a pilot lever having one end rigidly connected with a movable portion of the steering mechanism of the tractor and an operative connection between the other end thereof and said pilot bar.

9. In a tractor pilot structure, a supporting member, a pilot tongue having one end pivoted thereto, a pilot head pivoted to the other end of said tongue, a pilot wheel carried by said pilot head and a pair of chains having their ends connected with said supporting member and pilot head at points spaced on each side of the pivotal connections of the pilot tongue thereto.

10. In a tractor pilot structure, a supporting member, a pilot tongue having one end pivoted thereto, a pilot head pivoted to the other end of said tongue, a pilot wheel carried by said pilot head, a pair of chains having their ends connected with said supporting member and pilot head at points spaced on each side of the pivotal connections of the pilot tongue thereto and a cam member at one end of each chain over which the chain bends when the pilot tongue swings.

11. In a tractor pilot structure, a supporting member, a pilot tongue having one end pivoted thereto, a pilot head pivoted to the other end of said tongue, a pilot wheel carried by said pilot head, a pair of chains having their ends connected with said supporting member and pilot head at points spaced on each side of the pivotal connections of the pilot tongue thereto and a cam member at one end of each chain over which the chain bends when the pilot tongue swings, the surfaces of said cams being a different distance from each other than the distance between the opposite ends of said chains.

12. In a tractor pilot structure, a supporting member adapted to be attached to the front axle of a tractor, a pilot tongue pivoted thereto and extending forwardly therefrom, a pilot head pivoted to the forward end of said pilot tongue, a pilot arm extending transversely from said pilot head, a pilot wheel on the outer end of said pilot arm, a steering connection between the front wheels on said front axle and said pilot tongue and means for maintaining said pilot head at substantially the same angle relative to the tractor throughout the entire swinging movement of said pilot tongue, said means comprising arms on said supporting member and on said pilot head and flexible members having their ends connected to said arms, the connections of one end of each flexible element including a cam member over which the flexible member bends.

13. In a tractor pilot structure, a pilot tongue, a pivoted pilot arm mounted thereon and a combined raising and latching means for said pilot arm comprising a pulley on said arm spaced from its pivotal connection, a latch on said arm, a latch reception member on said tongue and a rope connected with said latch and extending over said pulley.

14. In a tractor pilot structure, a pilot tongue, a pilot arm pivoted thereto, an upright, means for securing the same to a tractor comprising upper and lower brackets adapted to be secured to the radiator thereof, a forked fitting secured to the lower bracket and to the upright, a U bolt encircling the upright and extending through the upper bracket, a pulley supported by said upright and a rope extending through said pulley and connected with said pilot arm.

15. In a tractor pilot structure, a supporting member adapted to be attached to the front axle of a tractor, a pilot tongue pivoted thereto and extending forwardly therefrom, a pilot head pivoted to the forward end of said pilot tongue, a pilot arm extending transversely from said pilot head, a pilot wheel on the outer end of said pilot arm, a steering connection between the front wheels on said front axle and said pilot tongue, said pilot head being inclined whereby said pilot arm tips backwardly when swung to an upright position.

Des Moines, Iowa, November 7, 1929.
ORR T. NICHOL.